United States Patent
Wan

(10) Patent No.: US 12,493,599 B2
(45) Date of Patent: Dec. 9, 2025

(54) DATA PROCESSING METHOD, SERVER, AND SYSTEM

(71) Applicant: HUAWEI TECHNOLOGIES CO., LTD., Guangdong (CN)

(72) Inventor: Mingxiang Wan, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 18/470,980

(22) Filed: Sep. 20, 2023

(65) Prior Publication Data

US 2024/0012800 A1 Jan. 11, 2024

Related U.S. Application Data

(63) Continuation of application No. PCT/CN2022/075218, filed on Jan. 30, 2022.

(30) Foreign Application Priority Data

Mar. 29, 2021 (CN) .......................... 202110336839.2

(51) Int. Cl.
*G06F 16/00* (2019.01)
*G06F 16/22* (2019.01)
*G06F 16/2455* (2019.01)

(52) U.S. Cl.
CPC ...... *G06F 16/2255* (2019.01); *G06F 16/2237* (2019.01); *G06F 16/2455* (2019.01)

(58) Field of Classification Search
CPC ............ G06F 16/2255; G06F 16/2237; G06F 16/2455; G06F 16/22
See application file for complete search history.

(56) References Cited

U.S. PATENT DOCUMENTS

| 2018/0314731 | A1* | 11/2018 | Mathew | ............... G06F 16/2272 |
| 2018/0341596 | A1 | 11/2018 | Teotia et al. | |
| 2023/0205751 | A1* | 6/2023 | Witte | .................. G06F 16/1827 707/696 |

FOREIGN PATENT DOCUMENTS

| CN | 111400307 A | 7/2020 |
| CN | 111581206 A | 8/2020 |

OTHER PUBLICATIONS

Extended European Search Report in European Appln No. 22778358.6, dated Jun. 27, 2024, 8 pages.

(Continued)

*Primary Examiner* — Paul Kim
(74) *Attorney, Agent, or Firm* — Fish & Richardson P.C.

(57) ABSTRACT

One example server includes a network interface card and a memory. The memory is configured to store first index information and second index information. The network interface card is configured to receive an operation request, and access data in the memory based on the first index information and the second index information. The first index information includes a plurality of key-value pairs, and one key-value pair includes a keyword and a value. The second index information includes a plurality of key-value pair groups, and one key-value pair group includes a keyword group and a value group. The keyword group corresponds to a plurality of keywords in the first index information, and the value group corresponds to a plurality of values in the first index information. The keyword group and the value group included in the key-value pair group are stored in a segment of continuous storage space of the memory.

20 Claims, 5 Drawing Sheets

(56) References Cited

OTHER PUBLICATIONS

International Search Report and Written Opinion in International Appln. No. PCT/CN2022/075218, mailed on Apr. 20, 2022, 16 pages (with English translation).

* cited by examiner

DATA PROCESSING METHOD, SERVER, AND SYSTEM

CROSS-REFERENCE TO RELATED APPLICATIONS

This application is a continuation of International Application No. PCT/CN2022/075218, filed on Jan. 30, 2022, which claims priority to Chinese Patent Application No. 202110336839.2, filed on Mar. 29, 2021. The disclosures of the aforementioned applications are hereby incorporated by reference in their entireties.

TECHNICAL FIELD

This application relates to the field of storage technologies, and in particular, to a data processing method, a server, and a system.

BACKGROUND

Because a key-value database stores a key-value pair, an operation of the key-value database is usually a read/write operation. The key-value database may serve as a server to exchange data with a client. For example, when the client requests the server to query a value of a keyword, the server queries a memory based on the keyword and returns the queried value of the keyword to the client. However, such a one-to-one query results in high communication overheads and low query efficiency.

SUMMARY

This application provides a data processing method, a server, and a system, to resolve problems of high communication overheads and low query efficiency when a value of a keyword is queried in a key-value database.

To achieve the foregoing objective, this application uses the following technical solutions.

According to a first aspect, this application provides a server. The server includes a network interface card and a memory. The memory is configured to store first index information and second index information. The network interface card is configured to receive an operation request from a client, and access data in the memory based on the first index information and the second index information in response to the operation request. The first index information includes a plurality of key-value pairs, and one key-value pair includes a keyword and a value. The second index information includes a plurality of key-value pair groups, and one key-value pair group includes a keyword group and a value group. The keyword group corresponds to a plurality of keywords in the first index information, and the value group corresponds to a plurality of values in the first index information. The keyword group and the value group included in the key-value pair group are stored in a segment of continuous storage space of the memory.

In this way, when the client requests the server to query a specific keyword, the server can determine, based on the first index information and the second index information, a value group corresponding to a keyword group corresponding to the keyword, and return data in continuous storage space storing the keyword group and the value group to the client. When the server is a key-value database, range query of the key-value database is implemented, in other words, a plurality of key-value pairs can be queried based on one keyword, thereby reducing communication overheads and improving communication efficiency.

Optionally, in a possible implementation of this application, the memory includes a plurality of buckets, where one bucket includes a plurality of slots. One slot is configured to store the keyword group and the value group included in one key-value pair group.

Optionally, in another possible implementation of this application, in ratios of the keywords in the first index information to a preset value, a plurality of keywords with a same ratio correspond to one keyword group.

Optionally, in another possible implementation of this application, the operation request may be a query request, where the query request includes a first keyword. In this case, the network interface card is specifically configured to: determine the keyword group in the second index information based on a ratio of the first keyword to the preset value; determine the plurality of keywords in the first index information that correspond to the keyword group; determine, in the first index information, a value corresponding to each of the plurality of keywords; and send the plurality of keywords and the value corresponding to each keyword to the client.

The server implements range query of a key-value pair. The plurality of key-value pairs can be queried based on the keyword and returned the plurality of key-value pairs to the client, improving query efficiency.

Optionally, in another possible implementation of this application, the network interface card is specifically configured to: determine one slot of one bucket based on the keyword group and a preset algorithm; and obtain, from the slot, the plurality of keywords and the value corresponding to each keyword. The slot includes the keyword group and the value group.

By locating a slot in a bucket, a plurality of key-value pairs corresponding to one key-value pair group can be directly read.

Optionally, in another possible implementation of this application, the network interface card is further configured to: receive a first write request from the client and including a second key-value pair; allocate an identifier to the second key-value pair; and store, in the memory, the second key-value pair based on the identifier. The identifier indicates a write sequence of the second key-value pair.

The server writes the key-value pair into the memory based on the identifier, so that a sequence of the key-value pair written into the server can be ensured.

Optionally, in another possible implementation of this application, the server may further include a processor. The processor is configured to: query a bitmap corresponding to the keyword in the first index information; and determine, based on the bitmap, whether to write the second key-value pair into the first index information.

By determining whether to write the key-value pair into the first index information, the server can ensure consistency of data written into the first index information.

According to a second aspect, this application provides a data processing method. A client sends an operation request to a server, and the server accesses data in a memory of the server based on first index information and second index information in response to the operation request. The memory stores the first index information and the second index information. The first index information includes a plurality of key-value pairs, and one key-value pair includes a keyword and a value. The second index information includes a plurality of key-value pair groups, and one key-value pair group includes a keyword group and a value group. The keyword group corresponds to a plurality of keywords in the first index information, and the value group corresponds to a plurality of values in the first index information. The keyword group and the value group included in the key-value pair group are stored in a segment of continuous storage space of the memory.

In this way, when the client requests the server to query a specific keyword, the server can determine, based on the first index information and the second index information, a value group corresponding to a keyword group corresponding to the keyword, and return data in continuous storage space storing the keyword group and the value group to the client. When the server is a key-value database, range query of the key-value database is implemented, in other words, a plurality of key-value pairs can be queried based on one keyword, thereby reducing communication overheads and improving communication efficiency.

Optionally, in a possible implementation of this application, the memory includes a plurality of buckets, where one bucket includes a plurality of slots. One slot is configured to store the keyword group and the value group included in one key-value pair group.

Optionally, in another possible implementation of this application, in ratios of the keywords in the first index information to a preset value, a plurality of keywords with a same ratio correspond to one keyword group.

Optionally, in another possible implementation of this application, the operation request is a query request, where the query request includes a first keyword. The method that "the server accesses data in a memory of the server based on first index information and second index information in response to the operation request" may include: The server determines the keyword group in the second index information based on a ratio of the first keyword to the preset value, determines the plurality of keywords in the first index information that correspond to the keyword group, and determines, in the first index information, a value corresponding to each of the plurality of keywords. Then, the server sends the plurality of keywords and the value corresponding to each keyword to the client.

The server implements range query of a key-value pair. The plurality of key-value pairs can be queried based on the keyword and returned the plurality of key-value pairs to the client, improving query efficiency.

Optionally, in another possible implementation of this application, the method that "the server determines the plurality of keywords in the first index information that correspond to the keyword group, and determines, in the first index information, a value corresponding to each of the plurality of keywords" may include: The server determines one slot of one bucket based on the keyword group and a preset algorithm, where the slot includes the keyword group and the value group. The server obtains, from one slot, a plurality of keywords and the value corresponding to each keyword.

By locating a slot in a bucket, a plurality of key-value pairs corresponding to one key-value pair group can be directly read.

Optionally, in another possible implementation of this application, the data processing method in this application may further include: The client sends a first write request to the server, where the first write request includes a second key-value pair. The server allocates an identifier to the second key-value pair, and stores, in the memory, the second key-value pair based on the identifier. The identifier indicates a write sequence of the second key-value pair.

The server writes the key-value pair into the memory based on the identifier, so that a sequence of the key-value pair written into the server can be ensured.

Optionally, in another possible implementation of this application, the data processing method in this application may further include: The server queries a bitmap corresponding to the keyword in the first index information, and determines, based on the bitmap, whether to write the second key-value pair into the first index information.

By determining whether to write the key-value pair into the first index information, the server can ensure consistency of data written into the first index information.

According to a third aspect, this application provides a server, where the server includes a receiving unit and an access unit. The receiving unit is configured to receive an operation request from a client. The access unit is configured to access data in a memory of the server based on first index information and second index information in response to the operation request received by the receiving unit. The memory of the server stores the first index information and the second index information. The first index information includes a plurality of key-value pairs, and one key-value pair includes a keyword and a value. The second index information includes a plurality of key-value pair groups, and one key-value pair group includes a keyword group and a value group. The keyword group corresponds to a plurality of keywords in the first index information, and the value group corresponds to a plurality of values in the first index information. The keyword group and the value group included in the key-value pair group are stored in a segment of continuous storage space of the memory.

Optionally, in a possible implementation of this application, the memory includes a plurality of buckets, where one bucket includes a plurality of slots. One slot is configured to store the keyword group and the value group included in one key-value pair group.

Optionally, in another possible implementation of this application, in ratios of the keywords in the first index information to a preset value, a plurality of keywords with a same ratio correspond to one keyword group.

Optionally, in another possible implementation of this application, the operation request is a query request, where the query request includes a first keyword. The access unit is specifically configured to: determine the keyword group in the second index information based on a ratio of the first keyword to the preset value; determine the plurality of keywords in the first index information that correspond to the keyword group; determine, in the first index information, a value corresponding to each of the plurality of keywords; and finally send the plurality of keywords and the value corresponding to each keyword to the client.

Optionally, in another possible implementation of this application, the access unit is specifically configured to: determine one slot of one bucket based on the keyword group and a preset algorithm, where the slot includes the keyword group and the value group; and obtain, from the slot, the plurality of keywords and the value corresponding to keyword.

Optionally, in another possible implementation of this application, the server further includes an allocation unit and a storage unit. The receiving unit is further configured to receive a first write request from the client, where the first write request includes a second key-value pair. The allocation unit is configured to allocate an identifier to the second key-value pair received by the receiving unit. The storage unit is configured to store, in the memory, the second key-value pair based on the identifier allocated by the allocation unit. The identifier indicates a write sequence of the second key-value pair.

Optionally, in another possible implementation of this application, the server further includes a querying unit and a determining unit. The querying unit is configured to query a bitmap corresponding to the keyword in the first index information. The determining unit is configured to determine, based on the bitmap queried by the querying unit, whether to write the second key-value pair into the first index information.

According to a fourth aspect, this application provides a server, where the server includes a memory and a processor. The memory is coupled to the processor. The memory is configured to store computer program code, where the computer program code includes computer instructions. When the processor executes the computer instructions, the server performs the data processing method according to the second aspect and any one possible implementation of the second aspect.

According to a fifth aspect, this application provides a chip system, where the chip system is applied to a server. The chip system includes one or more interface circuits and one or more processors. The interface circuit and the processor are interconnected through a line. The interface circuit is configured to: receive a signal from a memory of the server; and send the signal to the processor, where the signal includes computer instructions stored in the memory. When the processor executes the computer instructions, the server performs the data processing method according to the second aspect and any one possible implementation of the second aspect.

According to a sixth aspect, this application provides a computer-readable storage medium where the computer-readable storage medium includes computer instructions. When the computer instructions are run on a server, the server is enabled to perform the data processing method according to the second aspect and any one possible implementation of the second aspect.

According to a seventh aspect, this application provides a computer program product, where the computer program product includes computer instructions. When the computer instructions are run on a server, the server is enabled to perform the data processing method according to the second aspect and any one possible implementation of the second aspect.

For specific descriptions of the second aspect to the seventh aspect and various implementations thereof in this application, refer to detailed descriptions of the first aspect and the various implementations thereof. In addition, for beneficial effects of the second aspect to the seventh aspect and the various implementations thereof, refer to the analysis of beneficial effects of the first aspect and the various implementations thereof. Details are not described herein again.

These aspects or other aspects in this application are more concise and comprehensible in the following descriptions.

DESCRIPTION OF EMBODIMENTS

Figure 1:
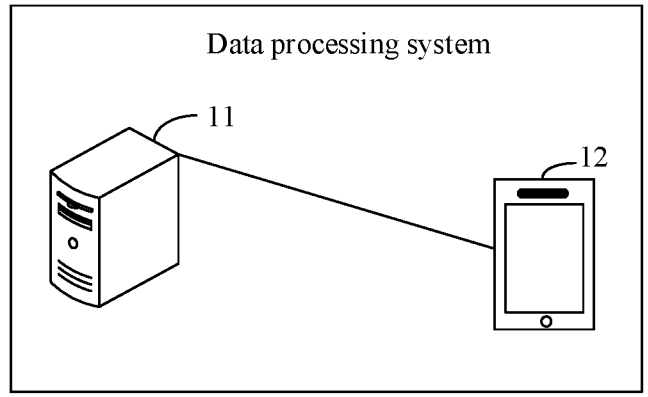
FIG. 1 is a schematic diagram of a data processing system according to an embodiment of this application.

In addition, in embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a relative concept in a specific manner.

The terms "first" and "second" mentioned below are merely intended for a purpose of description, and shall not be understood as an indication, implication of relative importance or implicit indication of a quantity of indicated technical features. Therefore, a feature limited by "first" or "second" may explicitly or implicitly include one or more features. In the description of embodiments of this application, unless otherwise specified, "a plurality of" means two or more than two.

A remote direct memory access (RDMA) is generated to resolve a delay in data processing between a client and a server during network transmission. An RDMA network protocol allows a user program to bypass a kernel of an operating system and directly perform network communication. This not only avoids duplication overheads from user space to system space, but also reduces processing overheads of entering the kernel, greatly reduces a network latency, and improves a throughput. In addition, by using an RDMA technology, the client may read/write data in a memory of the server via a network interface card.

Because an operation of a key-value database is usually a read/write operation, the RDMA technology may be effectively used. However, the key-value database based on the RDMA technology does not support range query, resulting in high communication overheads and low query efficiency.

To resolve the problems of high communication overheads and low query efficiency when a value of a keyword is queried in the key-value database, an embodiment of this application provides a data processing method. After receiving an operation request from a client, a server accesses data in a memory of the server based on first index information and second index information in response to the operation request. The first index information includes a plurality of key-value pairs, and the second index information includes a plurality of key-value pair groups. One key-value pair group includes a keyword group and a value group. The keyword group corresponds to a plurality of keywords in the first index information, and the value group corresponds to a plurality of values in the first index information. The keyword group and the value group included in the key-value pair group are stored in a segment of continuous space of the memory. Therefore, when the client requests the server to query a specific keyword, the server can determine, based on the first index information and the second index information, a value group corresponding to a keyword group corresponding to the keyword, and return, to the client, data in the continuous storage space storing the keyword group and the value group. In this way, when the server is the key-value database, range query of the key-value database is implemented, in other words, a plurality of key-value pairs are queried based on one keyword, thereby reducing communication overheads and improving communication efficiency.

The data processing method provided in this embodiment of this application is applicable to a data processing system. FIG. 1 shows a structure of the data processing system. As shown in FIG. 1, the data processing system may include a server 11 and an electronic device 12. A connection is established between the server 11 and the electronic device 12 in a wired communication manner or a wireless communication manner.

The client is deployed on the electronic device 12. The client is configured to send the operation request to the server 11, where the operation request may be a query request, a read request, or the like. The read request may be a one-sided RDMA read request or a double-sided RDMA read request.

In some embodiments, the electronic device 12 may be a terminal device. The terminal device may be a mobile phone, a tablet computer, a laptop computer, a palmtop computer, a computer, or the like.

The server 11 is configured to receive the operation request from the client, and access data in a memory of the server 11 based on the first index information and the second index information in response to the operation request.

In some embodiments, the server 11 may be one server, a server cluster including a plurality of servers, a cloud computing service center, or a storage array. A specific form of the server 11 is not limited herein in this embodiment of this application.

It should be noted that the data processing system shown in FIG. 1 is merely used as an example, but is not intended to limit technical solutions in embodiments of this application. A person skilled in the art should understand that in a specific implementation process, the data processing system may further include another node, and determine a quantity of nodes based on a specific requirement. This is not limited.

Figure 2:
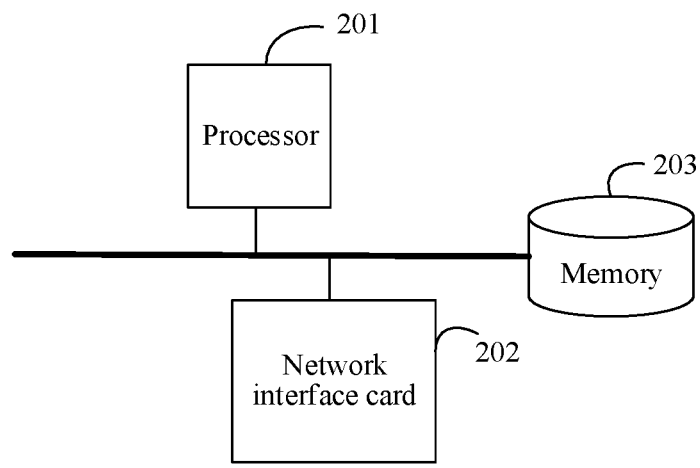
FIG. 2 is a schematic diagram of a structure of a computing apparatus according to an embodiment of this application.

Basic hardware structures of the server 11 and the electronic device 12 are similar, and both include elements included in a computing apparatus shown in FIG. 2. The following describes hardware structures of the server 11 and the electronic device 12 by using the computing apparatus shown in FIG. 2 as an example.

As shown in FIG. 2, the computing apparatus may include a processor 201, a network interface card 202, and a memory 203 that are configured to implement a data processing method provided in an embodiment of this application. In this embodiment of this application, the memory may also be referred to as a memory, a cache, or the like.

The processor 201 may be a general-purpose central processing unit (CPU), a microprocessor, an application-specific integrated circuit (ASIC), or one or more integrated circuits configured to control execution of programs in solutions in this application.

The network interface card 202 may support various memory access protocols. If a client is deployed on the computing apparatus, the network interface card 202 may be configured to send an operation request, for example, a query request or a read/write request. If the computing apparatus is the server 11, the network interface card 202 may be configured to receive, parse and execute the operation request. It may be understood that the network interface card 202 in this embodiment of this application may alternatively be replaced with a chip. The chip also supports various memory access protocols, and may perform an action performed by the network interface card 202 in this embodiment of this application.

The memory 203 may be a read-only memory (ROM), another type of static storage device that may store static information and instructions, a random access memory (RAM), or another type of dynamic storage device that may store information and instructions, but is not limited thereto. The memory 203 may exist independently, and is coupled to the processor 201. The memory 203 may alternatively be integrated with the processor 201. The memory 203 provided in this embodiment of this application may usually be non-volatile.

It may be understood that in some embodiments, a client may send a query request to access data in a server. In some embodiments, the client may read/write the data in the server by using a one-sided RDMA, or may read/write the data in the server by using a double-sided RDMA. An example in which hardware structures of an electronic device and the server are as shown in FIG. 2 is used, and the following separately describes specific processes in which the client reads the data in a memory of the server by using the-sided RDMA, and reads the data in the memory of the server by using the double-sided RDMA.

For the-sided RDMA, the client may directly determine a location of metadata of to-be-read data in the memory of the server. Therefore, location information of the metadata is carried in a read request, and the read request is sent to the server via a network interface card of the electronic device on which the client is deployed. The server reads, via the network interface card of the server, the metadata corresponding to the location information in the memory, and obtains the to-be-read data based on the metadata. In the foregoing processes, the processor of the server is unaware of a series of operations of the client. In other words, the processor of the server does not know that the client performs a read operation. This reduces consumption of participating in a data transmission process by the processor of the server, improves performance of system service processing, and is characterized by high bandwidth, low latency, and low CPU usage.

For the double-sided RDMA, the client does not know the location of the metadata of the to-be-read data stored in the memory of the server. Therefore, the client can request, only via the network interface card of the electronic device on which the client is deployed, the server to read the to-be-read data. The read request does not carry the location information of the metadata of the to-be-read data. After receiving the read request via the network interface card of the server, the server queries the location information of the metadata of the to-be-read data, and returns the location information to the client. The client sends the read request to the server again. The read request includes the location information of the metadata. The server obtains the metadata based on the location information of the metadata, further obtains the to-be-read data, and sends the to-be-read data to the client. The processor of the server needs to participate in this process. In other words, the double-sided RDMA needs the processor of the server to process the read request. Therefore, compared with the double-sided RDMA, the-sided RDMA has characteristics of shorter data reading time, lower processor usage, and better user experience. Therefore, the-sided RDMA is increasingly widely used.

It may be understood that the data in the memory of the server may be stored in a form of an index. The following describes the index in detail.

1. Index

The memory of the server is configured to store first index information and second index information. The first index information includes a plurality of key-value pairs, and one key-value pair includes a keyword and a value. The second index information includes a plurality of key-value pair groups, and one key-value pair group includes a keyword group and a value group. The keyword group corresponds to a plurality of keywords in the first index information, and the value group corresponds to a plurality of values in the first index information. The value in this embodiment of this application may be the metadata or the data. This is not limited herein in this embodiment of this application.

The keyword group and the value group included in the key-value pair group are stored in a segment of continuous storage space of the memory. Alternatively, the keyword group and the value group included in the key-value pair group correspond to a plurality of key-value pairs. One key-value pair corresponds to one piece of pointer information, and a plurality of pieces of pointer information are stored in the segment of continuous storage space of the memory.

It may be understood that the keyword group is merely a logical concept, and does not really exist. For example, the keyword group may be the metadata, where the metadata is used to describe the plurality of keywords corresponding to the keyword group. In this case, a value group corresponding to the keyword group may be another piece of metadata, where the metadata is used to describe a value of each of the plurality of keywords corresponding to the keyword group.

Optionally, a correspondence between the keyword group and the keyword in the first index information is implemented by using a preset value. Specifically, in ratios of the keywords in the first index information to the preset value, a plurality of keywords with a same ratio correspond to one keyword group. A ratio refers to an integer value.

For example, all keywords in the first index information are divided into a plurality of logically continuous ranges by using the preset value. One range corresponds to one keyword group. A specific process is: calculating an integer ratio of each keyword to the preset value, and dividing a plurality of keywords with a same ratio into the range.

Figure 3:
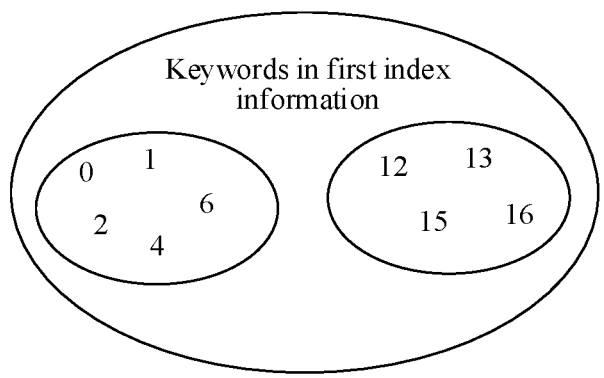
FIG. 3 is a schematic diagram of division of a plurality of keywords according to an embodiment of this application.

For example, assuming that the keywords in the first index information are respectively 0, 1, 2, 4, 6, 12, 13, 15, and 16, and the preset value is 10. In this case, as shown in FIG. 3, the keywords in the first index information may be divided into two ranges. The keywords 0, 1, 2, 4, and 6 correspond to a range 0, and the keywords 12, 13, 15, and 16 correspond to a range 1. The range 0 and the range 1 each correspond to one keyword group.

When the memory of the server stores the first index information and the second index information, and the client sends the operation request to the server, the server may access the data in the memory of the server based on the first index information and the second index information in response to the operation request. The operation request may be the query request, a one-sided RDMA read request, or a double-sided RDMA read request.

Figure 4A:
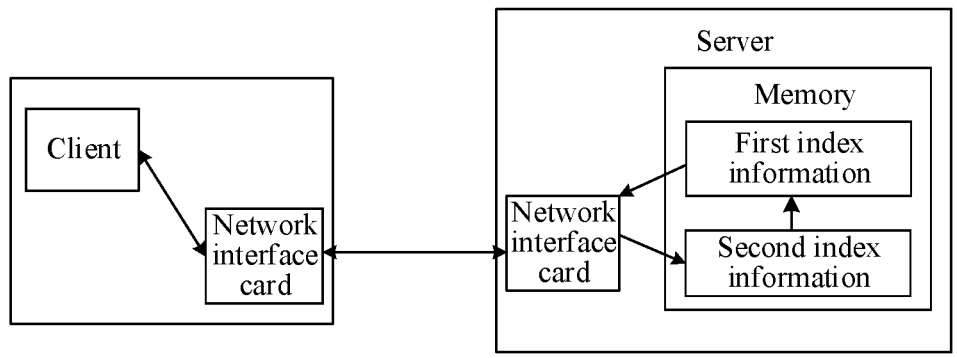
FIG. 4a is a schematic diagram of a scenario in which a query request queries data according to an embodiment of this application.

In some embodiments, as shown in FIG. 4a, if the operation request is the query request, the client sends the query request to the server via the network interface card. The query request includes a first keyword. After the server receives the query request via the network interface card, the network interface card may determine a keyword group in the second index information based on a ratio of the first keyword in the query request to the preset value, determine the plurality of keywords in the first index information that correspond to the keyword group, and determine, in the first index information, a value corresponding to each of the plurality of keywords. Then, the server sends the plurality of keywords and the value corresponding to each keyword to the client via the network interface card.

Figure 4B:
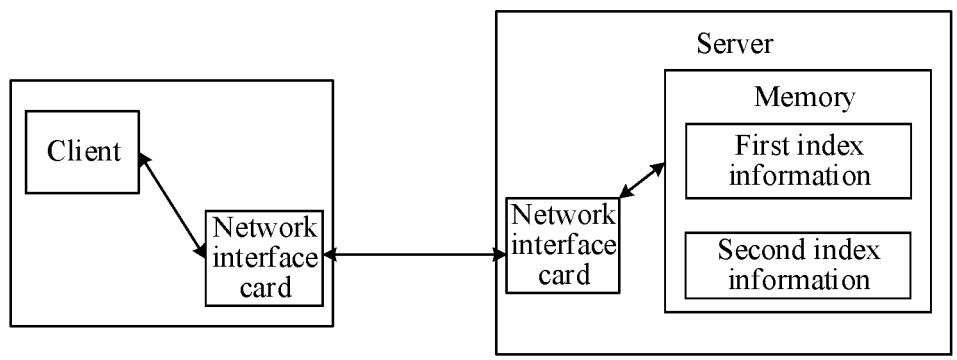
FIG. 4b is a schematic diagram of a scenario of one-sided RDMA read data according to an embodiment of this application.

In some embodiments, as shown in FIG. 4b, if the operation request is the-sided RDMA read request, before reading data of the server by using a one-sided RDMA, the client may determine, based on a first keyword, location information of a value group corresponding to a keyword group corresponding to the first keyword. The location information indicates locations of the keyword group and the value group in the server, for example, indicates locations of the keyword group and the value group in the first index information and the second index information. Then, the client includes the location information in the-sided RDMA read request, and sends the-sided RDMA read request to the server via the network interface card. After the server receives the-sided RDMA read request via the network interface card, the network interface card may obtain the keyword group and the value group based on the location information, and return the keyword group and the value group to the client.

Figure 4C:
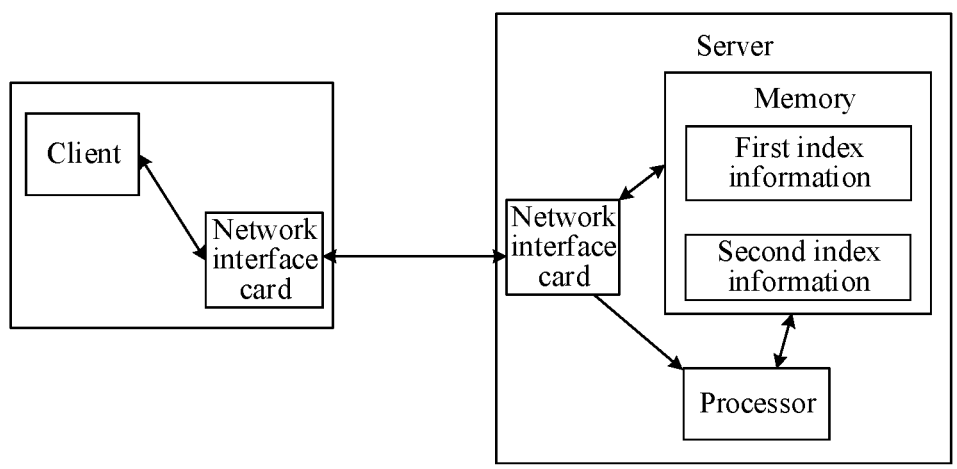
FIG. 4c is a schematic diagram of a scenario of double-sided RDMA read data according to an embodiment of this application.

In some embodiments, as shown in FIG. 4c, if the operation request is the double-sided RDMA read request, the client sends the double-sided RDMA read request including a first keyword to the server via the network interface card. After the server receives the double-sided RDMA read request via the network interface card, the network interface card transmits the double-sided RDMA read request to a processor. The processor parses the double-sided RDMA read request, and determines, based on the first keyword, the first index information, and the second index information, location information of a value group corresponding to a keyword group corresponding to the first keyword. The processor of the server returns the location information of the value group to the client via the network interface card. After receiving, via the network interface card, the location information returned by the server, the client may perform a one-sided RDMA read request operation once, to obtain the keyword group and the value group corresponding to the first keyword.

Optionally, the client may further send a first write request to the server via the network interface card. The first write request includes a second key-value pair. After receiving the first write request, the network interface card of the server may allocate an identifier to the second key-value pair. The identifier indicates a write sequence of the second key-value pair. In addition, the network interface card of the server may store the second key-value pair in the memory based on the identifier. Specifically, the network interface card of the server may allocate, in the memory, a write address to the second key-value pair, and send the identifier and the allocated write address (or indication information of the write address) to the client. After receiving the identifier and the write address, the client may add the identifier to the second key-value pair, for example, add the identifier to a second value of the second key-value pair, and send a second write request to the server via the network interface card. The second write request includes the write address and the second key-value pair to which the identifier is added. After receiving the second write request via the network interface card, the server may write the second key-value pair to which the identifier is added to a location corresponding to the write address in the second write request. In this way, a sequence of the key-value pair written to the server can be ensured.

It may be understood that the identifier may be specifically a sequence number.

Optionally, after the network interface card writes the second key-value pair into the memory, the processor can query a bitmap corresponding to the keyword in the first index information, and determine, based on the bitmap, whether to write the second key-value pair into the first index information. The bitmap in the first index information is in a one-to-one correspondence with the keyword. A specific process is as follows. If the processor determines, based on the bitmap, that there is no second keyword stored in the first index information, the processor writes the second key-value pair into the first index information. If the processor determines, based on the bitmap, that there is a second keyword stored in the first index information, the processor skips performing a write operation.

Further, when added to the second key-value pair, the identifier can not only indicate the write sequence, but also indicate a version of the key-value pair. In this case, if determining, based on the bitmap, that there is the second keyword stored in the first index information, the processor compares the second key-value pair in the first index information with a version of a to-be-written second key-value pair. When determining that the version of the to-be-written second key-value pair is a latest version, a second value is written into a location corresponding to the second keyword in the first index information, to overwrite a previous second value corresponding to the second keyword; or when determining that the version of the to-be-written second key-value pair is not a latest version, no write operation is performed. In this way, the server can ensure consistency of written data.

Optionally, in an embodiment of this application, first index information and second index information stored in a memory may be specifically implemented by using a hash table.

A server may configure the hash table on at least one segment of continuous memory in the memory, where each segment of continuous memory corresponds to one hash table. For example, each segment of continuous memory may be divided into a plurality of buckets, and one bucket is further divided into a plurality of slots. One slot is configured to store a keyword group and a value group included in one key-value pair group, or is configured to store a plurality of pieces of pointer information corresponding to a plurality of key-value pairs corresponding to the keyword group and the value group.

Figure 5:
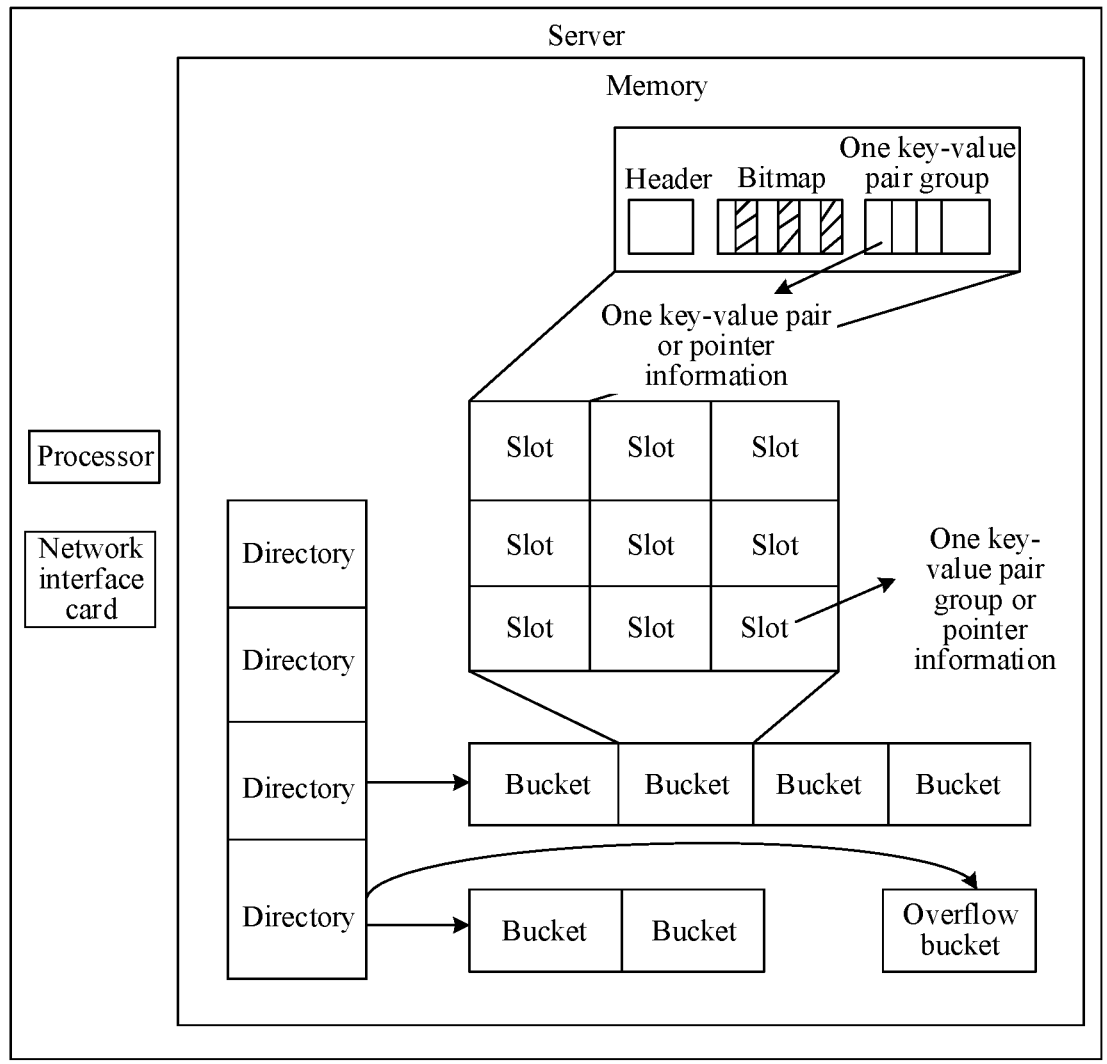
FIG. 5 is a schematic diagram of a structure of a hash table according to an embodiment of this application.

For example, as shown in FIG. 5, each segment of continuous memory corresponds to one hash table, where the hash table corresponds to a plurality of directories. One directory includes a first address of a bucket array and an address of an overflow bucket. Addresses of buckets included in the bucket array are continuous. The bucket includes a plurality of slots, and one slot is configured to store one key-value pair group or pointer information corresponding to the key-value pair group. Storage space in which the key-value pair group is located further stores a header, a bitmap, and a plurality of key-value pairs. The plurality of key-value pairs may be data, or may be pointer information of each key-value pair.

When the hash table is stored in the memory of the server, and a client sends an operation request to the server, the server may access data in the memory of the server based on the hash table in response to the operation request. The operation request may be a query request, a one-sided RDMA read request, or a double-sided RDMA read request.

In some embodiments, with reference to FIG. 4a, if the operation request is the query request, the client sends the query request to the server via a network interface card. The query request includes a first keyword. After the server receives the query request via the network interface card, the network interface card may determine the keyword group based on a ratio of the first keyword in the query request to a preset value, and determine one slot of one bucket based on the keyword group and a preset algorithm (which may be a hash algorithm). If the slot includes the keyword group and the value group, a plurality of keywords and a value corresponding to each keyword are obtained from the slot. In other words, the plurality of key-value pairs are obtained. Then, the server sends the plurality of key-value pairs to the client via the network interface card. If the slot includes a plurality of pieces of pointer information, the plurality of key-value pairs are first obtained based on the plurality of pieces of pointer information, and then returned to the client.

Assuming that the preset algorithm is the hash algorithm, a process in which the network interface card determines the slot of the bucket based on the keyword group and the preset algorithm is as follows: The network interface card calculates a hash value corresponding to the keyword group by using the hash algorithm. The hash value includes an identifier of the directory, an offset value, and a slot identifier. The offset value indicates an offset value of a to-be-determined bucket relative to a first bucket in the bucket array. In this way, the network interface card may first locate the directory based on the identifier of the directory, to locate a start location of a bucket array corresponding to the directory, that is, an address of the first bucket. Then, the network interface card locates an address of one bucket based on the offset value and the start location of the bucket array. Finally, the network interface card locates a slot of the bucket based on the slot identifier and the address of the bucket.

In some embodiments, with reference to FIG. 4b, if the operation request is the-sided RDMA read request, before reading data of the server by using a one-sided RDMA, the client may first obtain directories corresponding to the hash table from the server. In this way, when the client needs to read a value group corresponding to the first keyword, the network interface card of the client may locate, based on the first keyword, one bucket included in one directory, to obtain an address of the bucket. For a specific description of obtaining the address of the bucket, refer to the foregoing related descriptions. Details are not described herein again. The client may send the-sided RDMA read request to the server via the network interface card. The-sided RDMA read request includes the address of the bucket. The server returns a bucket memory of one bucket to the client via the network interface card. The client may locate one slot of the bucket based on the slot identifier. If one slot includes the keyword group and the value group, the network interface card of the client may obtain the plurality of key-value pairs from the slot. If one slot includes the plurality of pieces of pointer information, the client may obtain the plurality of key-value pairs from the server by performing a one-sided RDMA read operation.

In some embodiments, with reference to FIG. 4c, if the operation request is the double-sided RDMA read request, the client sends the double-sided RDMA read request including the first keyword to the server via the network interface card. Based on the manner in the foregoing embodiment, the network interface card of the server may locate one slot of one bucket based on the first keyword, and return location information of the slot of the bucket to the client. After receiving, via the network interface card, the location information returned by the server, the client may perform a one-sided RDMA read request operation once, to obtain the keyword group and the value group corresponding to the first keyword.

Optionally, when the memory stores the hash table, a process in which the client requests the server to write the data is similar to a process in which when the memory stores the first index information and the second index information, the client requests to write the data in another embodiment. Details are not described herein again.

In conclusion, when the server is a key-value database, range query of the key-value database is implemented, in other words, the plurality of key-value pairs are queried based on one keyword, thereby reducing communication overheads and improving communication efficiency.

The following specifically describes a data processing method provided in this embodiment of this application with reference to FIG. 1 and FIG. 2.

It may be understood that a same step, or a step or a technical feature having a same function in this embodiment of this application may be mutually referenced in different embodiments.

It may be understood that, in this embodiment of this application, a client and/or a server may perform some or all of steps in this embodiment of this application. The steps are merely examples. In this embodiment of this application, other steps or variations of various steps may alternatively be performed. In addition, the steps may be performed in a sequence different from a sequence presented in this embodiment of this application, and not all the steps in this embodiment of this application need to be performed.

In this embodiment of this application, a specific structure of an execution body of the data processing method is not particularly limited in this embodiment of this application, provided that the method provided in this embodiment of this application can be implemented. For example, the data processing method provided in this embodiment of this application may be executed by the client, or may be a component applied to the client, for example, a chip. This is not limited in this embodiment of this application. Alternatively, the data processing method provided in this embodiment of this application may be executed by the server, or may be a component applied to the server, for example, a chip. This is not limited in this application. In the following embodiment, an example in which the data processing method is executed by separately the client and the server for description.

Figure 6:
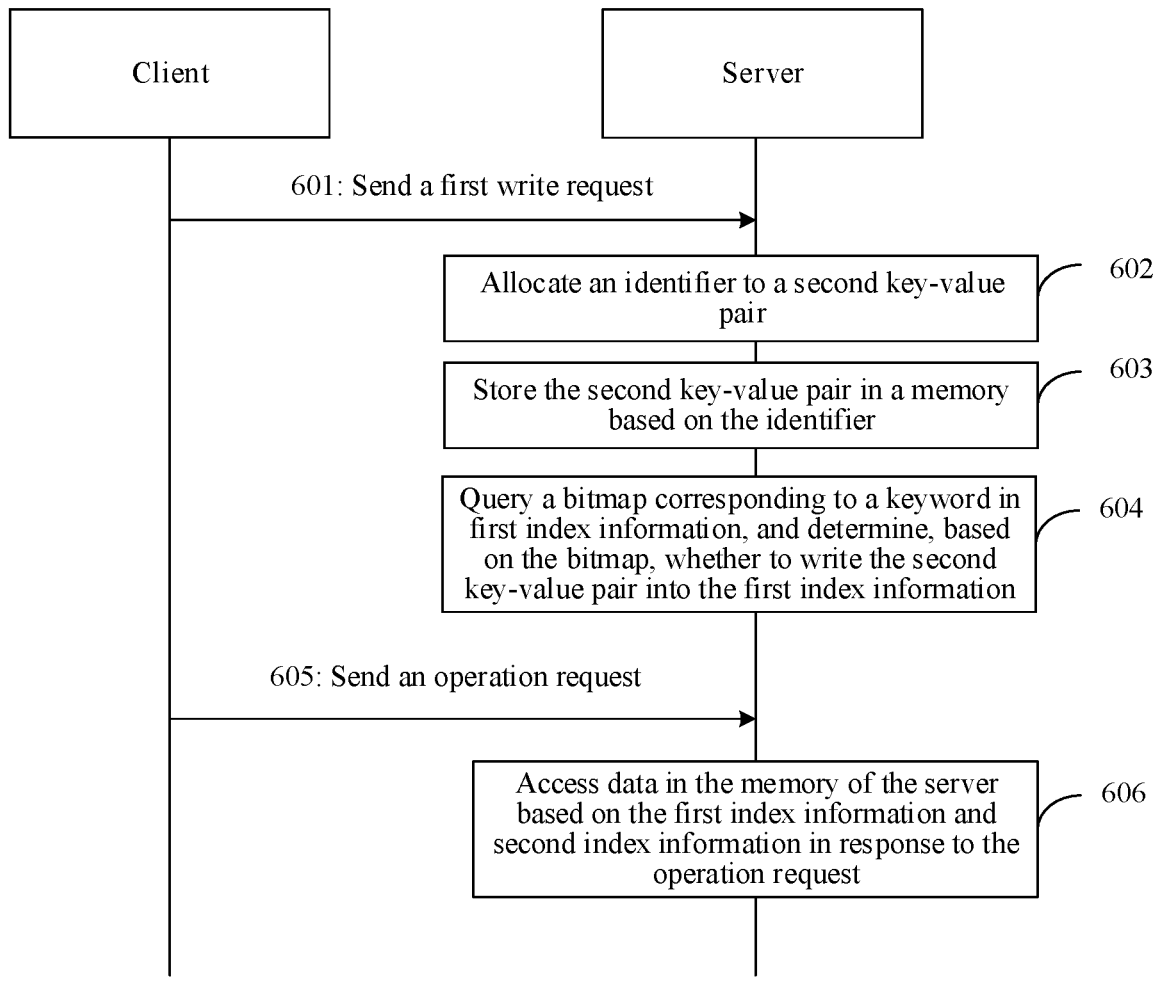
FIG. 6 is a schematic flowchart of a data processing method according to an embodiment of this application.

As shown in FIG. 6, the data processing method provided in this embodiment of this application may include the following step 601 to step 606. Step 601 to step 604 are that the client requests the server to write data. Step 605 to step 606 are that the client requests the server to read the data.

It should be noted that in this embodiment of this application, when the client requests the server to write the data, the server may alternatively determine, by querying a bitmap corresponding to a keyword in first index information, whether to write the data to a memory.

601: The client sends a first write request to the server. The first write request includes a second key-value pair.

602: The server allocates an identifier to the second key-value pair.

The identifier indicates a write sequence of the second key-value pair.

603: The server stores the second key-value pair in the memory based on the identifier.

604: The server queries the bitmap corresponding to the keyword in the first index information, and determines, based on the bitmap, whether to write the second key-value pair into the first index information.

It should be noted that for specific descriptions of step 601 to step 604, refer to related descriptions in another embodiment in which the client requests the server to write the data. Details are not described herein again.

605: The client sends an operation request to the server.

606: The server accesses the data in the memory of the server based on the first index information and second index information in response to the operation request.

It should be noted that for specific descriptions of step 605 to step 606, refer to related descriptions in another embodiment in which the client requests the server to read the data. Details are not described herein again.

The first index information includes a plurality of key-value pairs, and the second index information includes a plurality of key-value pair groups. One key-value pair group includes a keyword group and a value group. The keyword group corresponds to a plurality of keywords in the first index information, and the value group corresponds to a plurality of values in the first index information. The keyword group and the value group included in the key-value pair group are stored in a segment of continuous space of the memory. Therefore, when the client requests the server to query a specific keyword, the server can determine, based on the first index information and the second index information, a value group corresponding to a keyword group corresponding to the keyword, and return, to the client, data in the continuous storage space storing the keyword group and the value group. In this way, when the server is a key-value database, range query of the key-value database is implemented, in other words, a plurality of key-value pairs are queried based on one keyword, thereby reducing communication overheads and improving communication efficiency.

The foregoing mainly describes the solutions provided in embodiments of this application from the perspective of the methods. To implement the foregoing functions, corresponding hardware structures and/or software modules for performing the functions are included. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 7:
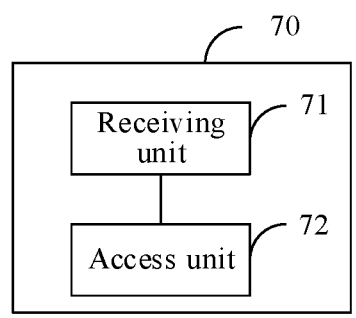
FIG. 7 is a first schematic diagram of a structure of a server according to an embodiment of this application.

FIG. 7 is a schematic diagram of a structure of a server 70 according to an embodiment of this application. The server 70 is configured to perform the data processing method shown in FIG. 6. The server 70 may include a receiving unit 71 and an access unit 72.

The receiving unit 71 is configured to receive an operation request from a client. The access unit 72 is configured to access data in a memory of the server 70 based on first index information and second index information in response to the operation request received by the receiving unit 71. The memory of the server stores the first index information and the second index information. The first index information includes a plurality of key-value pairs, and one key-value pair includes a keyword and a value. The second index information includes a plurality of key-value pair groups, and one key-value pair group includes a keyword group and a value group. The keyword group corresponds to a plurality of keywords in the first index information, and the value group corresponds to a plurality of values in the first index information. The keyword group and the value group included in the key-value pair group are stored in a segment of continuous storage space of the memory. For example, with reference to FIG. 6, the access unit 72 may be configured to perform step 606.

Optionally, the memory includes a plurality of buckets, where one bucket includes a plurality of slots. One slot is configured to store the keyword group and the value group included in one key-value pair group.

Optionally, in ratios of the keywords in the first index information to a preset value, a plurality of keywords with a same ratio correspond to one keyword group.

Optionally, the operation request is a query request, where the query request includes a first keyword. The access unit 72 is specifically configured to: determine the keyword group in the second index information based on a ratio of the first keyword to the preset value; determine the plurality of keywords in the first index information that correspond to the keyword group; determine, in the first index information, a value corresponding to each of the plurality of keywords; and finally send the plurality of keywords and the value corresponding to each keyword to the client.

Optionally, the access unit 72 is specifically configured to: determine one slot of one bucket based on the keyword group and a preset algorithm, where the slot includes the keyword group and the value group; and obtain, from the slot, the plurality of keywords and the value corresponding to each keyword.

Optionally, the receiving unit 71 is further configured to receive a first write request from the client, where the first write request includes a second key-value pair.

Figure 8:
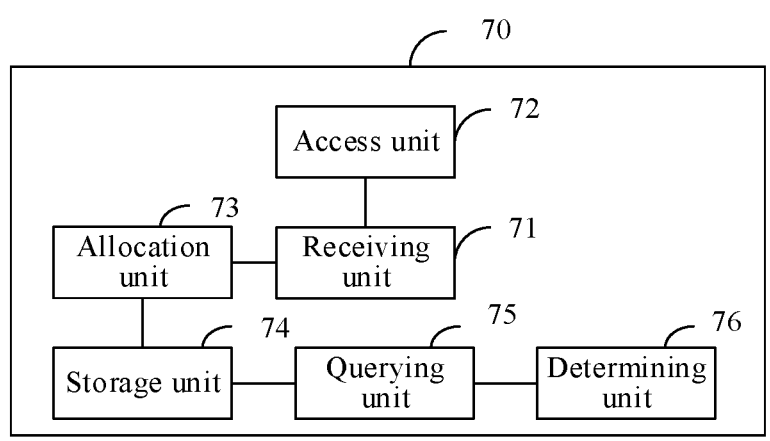
FIG. 8 is a second schematic diagram of a structure of a server according to an embodiment of this application.

As shown in FIG. 8, the server 70 further includes an allocation unit 73 and a storage unit 74. The allocation unit 73 is configured to allocate an identifier to the second key-value pair received by the receiving unit 71. For example, with reference to FIG. 6, the allocation unit 73 may be configured to perform step 602. The storage unit 74 is configured to store the second key-value pair in a memory based on the identifier allocated by the allocation unit 73. The identifier indicates a write sequence of the second key-value pair. For example, with reference to FIG. 6, the storage unit 74 may be configured to perform step 603.

Optionally, as shown in FIG. 8, the server 70 further includes a querying unit 75 and a determining unit 76. The querying unit 75 is configured to query a bitmap corresponding to a keyword in first index information. For example, with reference to FIG. 6, the querying unit 75 may be configured to perform an operation of querying the bitmap corresponding to the keyword in the first index information in step 604. The determining unit 76 is configured to determine, based on the bitmap queried by the querying unit 75, whether to write the second key-value pair into the first index information. For example, with reference to FIG. 6, the determining unit 76 may be configured to an operation of determining, based on the bitmap, whether to write the second key-value pair into the first index information in step 604.

Certainly, the server 70 provided in this embodiment of this application includes but is not limited to the foregoing modules.

In actual implementation, the access unit 72, the allocation unit 73, the querying unit 75, and the determining unit 76 may be implemented by the processor 201 shown in FIG. 2 by invoking program code in the memory 203. The receiving unit 71 may be implemented by the network interface card 202 shown in FIG. 2 by invoking program code in the memory 203. The storage unit 74 may be implemented by the program code in the memory 203 shown in FIG. 2. For a specific execution process, refer to descriptions of the data processing method part shown in FIG. 6. Details are not described herein again.

Another embodiment of this application further provides a computer-readable storage medium. The computer-readable storage medium stores computer instructions. When the computer instructions are run on a server, the server is enabled to perform the steps performed by the server in the method procedure shown in the foregoing method embodiments.

Another embodiment of this application further provides a chip system, where the chip system is applied to a server. The chip system includes one or more interface circuits and one or more processors. The interface circuit and the processor are interconnected through a line. The interface circuit is configured to: receive a signal from a memory of the server; and send the signal to the processor, where the signal includes computer instructions stored in a memory. When the processor executes the computer instructions, the server performs the steps performed by the server in the method procedure shown in the foregoing method embodiments.

In another embodiment of this application, a computer program product is further provided. The computer program product includes a computer instruction. When the computer instruction runs on a server, the server performs steps performed by the server in the method procedure shown in the foregoing method embodiments.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer-executable instructions are loaded and executed on a computer, the procedure or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid state-drive (SSD)), or the like.

The foregoing descriptions are merely specific implementations of this application. Any variation or replacement figured out by a person skilled in the art based on the specific implementations provided in this application shall fall within the protection scope of this application.

What is claimed is:

1. A server, comprising:
a network interface card; and
at least one memory, wherein the at least one memory comprises a segment of continuous storage space, and the continuous storage space is used to store a keyword group and a value group comprised in at least one key-value pair group;
wherein the at least one memory is configured to store first index information and second index information, the first index information comprises a plurality of key-value pairs, one key-value pair comprises a keyword and a value, the second index information comprises a plurality of key-value pair groups, the at least one key-value pair group comprises the keyword group and the value group, the keyword group corresponds to a plurality of keywords in the first index information, the plurality of keywords corresponding to the keyword group are grouped based on having a same ratio of each keyword to a preset value, and the value group corresponds to a plurality of values in the first index information; and
wherein the network interface card is configured to:
receive an operation request of a key-value database from a client, wherein the server includes the key-value database, and wherein the operation request comprises a first keyword; and
in response to receiving the operation request, send data to the client based at least on a ratio of the first keyword to the preset value, wherein the data is obtained in the at least one memory based on the key-value pair group.

2. The server according to claim 1, wherein the at least one memory comprises a plurality of buckets, one bucket comprises a plurality of slots, and one slot is configured to store the keyword group and the value group comprised in one key-value pair group.

3. The server according to claim 1, wherein in ratios of the keywords in the first index information to the preset value, a plurality of keywords with a same ratio correspond to one keyword group.

4. The server according to claim 1, wherein the network interface card is configured to:
determine the keyword group in the second index information based on the ratio of the first keyword to the preset value;
determine the plurality of keywords in the first index information that correspond to the keyword group;
determine, in the first index information, a value corresponding to each of the plurality of keywords; and
send the plurality of keywords and the value corresponding to each keyword to the client.

5. The server according to claim 4, wherein the network interface card is configured to:
determine one slot of one bucket based on the keyword group and a preset algorithm, wherein the slot comprises the keyword group and the value group; and
obtain, from the slot, the plurality of keywords and the value corresponding to each keyword.

6. The server according to claim 1, wherein the network interface card is further configured to:
receive a first write request from the client, wherein the first write request comprises a second key-value pair;
allocate an identifier to the second key-value pair, wherein the identifier indicates a write sequence of the second key-value pair; and
store the second key-value pair in the memory based on the identifier.

7. The server according to claim 6, wherein the server further comprises at least one processor, and the at least one memory stores programming instructions for execution by the at least one processor to:
query a bitmap corresponding to the keyword in the first index information; and
determine, based on the bitmap, whether to write the second key-value pair into the first index information.

8. A data processing method, comprising:
sending, by a client, an operation request of a key-value database to a server, wherein the server includes the key-value database, and wherein the operation request comprises a first keyword; and
in response to receiving the operation request, sending, by the server, data to the client based at least on a ratio of the first keyword to a preset value, wherein the data is obtained in at least one memory of the server based on a key-value pair group, wherein the at least one memory comprises a segment of continuous storage space, the continuous storage space is used to store a keyword group and a value group comprised in at least one key-value pair group, the at least one memory further stores first index information and second index information, the first index information comprises a plurality of key-value pairs, one key-value pair comprises a keyword and a value, the second index information comprises a plurality of key-value pair groups, the at least one key-value pair group comprises the keyword group and the value group, the keyword group corresponds to a plurality of keywords in the first index information, the plurality of keywords corresponding to the keyword group are grouped based on having a same ratio of each keyword to the preset value, and the value group corresponds to a plurality of values in the first index information.

9. The data processing method according to claim 8, wherein the at least one memory comprises a plurality of buckets, one bucket comprises a plurality of slots, and one slot is configured to store the keyword group and the value group comprised in one key-value pair group.

10. The data processing method according to claim 8, wherein in ratios of the keywords in the first index information to the preset value, a plurality of keywords with a same ratio correspond to one keyword group.

11. The data processing method according to claim 8, wherein obtaining, by the server, the data in the at least one memory of the server based on the first index information and the second index information in response to the operation request comprises:
determining, by the server, the keyword group in the second index information based on the ratio of the first keyword to the preset value;
determining, by the server, the plurality of keywords in the first index information that correspond to the keyword group;

determining, in the first index information, a value corresponding to each of the plurality of keywords; and sending, by the server, the plurality of keywords and the value corresponding to each keyword to the client.

12. The data processing method according to claim 11, wherein determining, by the server, the plurality of keywords in the first index information that correspond to the keyword group, and determining, in the first index information, a value corresponding to each of the plurality of keywords comprises:

determining one slot of one bucket based on the keyword group and a preset algorithm, wherein the slot comprises the keyword group and the value group; and obtaining the plurality of keywords and the value corresponding to each keyword from the slot.

13. The data processing method according to claim 8, wherein the data processing method further comprises:

sending, by the client, a first write request to the server, wherein the first write request comprises a second key-value pair;

allocating, by the server, an identifier to the second key-value pair; and storing the second key-value pair in the memory based on the identifier, wherein the identifier indicates a write sequence of the second key-value pair.

14. The data processing method according to claim 13, wherein the data processing method further comprises:

querying, by the server, a bitmap corresponding to the keyword in the first index information; and determining, based on the bitmap, whether to write the second key-value pair into the first index information.

15. A data processing system, wherein the data processing system comprises:

a client; and a server, wherein the server comprises a network interface card and at least one memory, the at least one memory comprises a segment of continuous storage space, and the continuous storage space is used to store a keyword group and a value group comprised in at least one key-value pair group;

wherein the at least one memory is configured to store first index information and second index information, the first index information comprises a plurality of key-value pairs, one key-value pair comprises a keyword and a value, the second index information comprises a plurality of key-value pair groups, the at least one key-value pair group comprises the keyword group and the value group, the keyword group corresponds to a plurality of keywords in the first index information, the plurality of keywords corresponding to the keyword group are grouped based on having a same ratio of each keyword to a preset value, and the value group corresponds to a plurality of values in the first index information;

wherein the network interface card is configured to:

receive an operation request of a key-value database from a client, wherein the server includes the key-value database, and wherein the operation request comprises a first keyword; and in response to receiving the operation request, send data to the client based at least on a ratio of the first keyword to the preset value, wherein the data is obtained in the at least one memory based on the key-value pair group; and wherein the client is configured to send the operation request to the server.

16. The data processing system according to claim 15, wherein the at least one memory comprises a plurality of buckets, one bucket comprises a plurality of slots, and one slot is configured to store the keyword group and the value group comprised in one key-value pair group.

17. The data processing system according to claim 15, wherein in ratios of the keywords in the first index information to the preset value, a plurality of keywords with a same ratio correspond to one keyword group.

18. The data processing system according to claim 15, wherein the at least one memory comprises a plurality of buckets, one bucket comprises a plurality of slots, and one slot is configured to store the keyword group and the value group comprised in one key-value pair group.

19. The data processing system according to claim 15, wherein the network interface card is configured to:

determine the keyword group in the second index information based on the ratio of the first keyword to the preset value;

determine the plurality of keywords in the first index information that correspond to the keyword group;

determine, in the first index information, a value corresponding to each of the plurality of keywords; and send the plurality of keywords and the value corresponding to each keyword to the client.

20. The data processing system according to claim 19, wherein the network interface card is configured to:

determine one slot of one bucket based on the keyword group and a preset algorithm, wherein the slot comprises the keyword group and the value group; and obtain, from the slot, the plurality of keywords and the value corresponding to each keyword.

* * * * *